(12) United States Patent
Wilby

(10) Patent No.: US 10,031,207 B2
(45) Date of Patent: Jul. 24, 2018

(54) WIDEBAND CHANNEL EQUALIZATION FOR SIGNALS PROPAGATED IN LOSSY TRANSMISSION MEDIA

(71) Applicant: Raytheon Company, Waltham, MA (US)

(72) Inventor: Andrew Wilby, Warwick, RI (US)

(73) Assignee: Raytheon Company, Waltham, MA (US)

( * ) Notice: Subject to any disclaimer, the term of this patent is extended or adjusted under 35 U.S.C. 154(b) by 258 days.

(21) Appl. No.: 15/059,618

(22) Filed: Mar. 3, 2016

(65) Prior Publication Data

US 2016/0266230 A1 Sep. 15, 2016

Related U.S. Application Data

(60) Provisional application No. 62/131,556, filed on Mar. 11, 2015.

(51) Int. Cl.
| | | |
|---|---|---|
| *G01S 3/82* | (2006.01) | |
| *G01S 7/52* | (2006.01) | |
| *G01S 7/527* | (2006.01) | |
| *G01S 15/10* | (2006.01) | |
| *G01S 15/02* | (2006.01) | |

(52) U.S. Cl.
CPC ............ *G01S 3/82* (2013.01); *G01S 7/52003* (2013.01); *G01S 7/527* (2013.01); *G01S 15/02* (2013.01); *G01S 15/104* (2013.01)

(58) Field of Classification Search
CPC ........ G01S 3/82; G01S 15/02; G01S 7/52003; G01S 7/527; G01S 15/104
See application file for complete search history.

(56) References Cited

U.S. PATENT DOCUMENTS

| | | | |
|---|---|---|---|
| 6,104,673 A | 8/2000 | Cole | |
| 6,741,711 B1 * | 5/2004 | Sibbald | ................... H04S 1/007 |
| | | | 381/310 |
| 7,046,582 B1 | 5/2006 | Kosalos et al. | |
| 2001/0033614 A1 * | 10/2001 | Hudson | ................ H04B 1/7102 |
| | | | 375/229 |

(Continued)

FOREIGN PATENT DOCUMENTS

| | | |
|---|---|---|
| EP | 1 160 584 A2 | 12/2001 |
| GB | 2 430 743 A | 4/2007 |

OTHER PUBLICATIONS

Non-Final Office Action dated Sep. 25, 2017 for U.S. Appl. No. 14/644,866; 8 pages.

(Continued)

*Primary Examiner* — Hovhannes Baghdasaryan
(74) *Attorney, Agent, or Firm* — Daly, Crowley, Mofford & Durkee, LLP (57) ABSTRACT

A compensation filter is operable to receive a received signal in response to a transmitted signal, the received signal having a time duration. The compensation filter is operable to generate a compensated signal. The compensation filter changes shape of an associated transfer function during the time duration of the received signal to result in the compensated signal having an improved spectral flatness throughout the time duration of the received signal. The compensation filter can be used in a sonar system. A method, which can be used in a sonar system, uses the compensation filter.

23 Claims, 6 Drawing Sheets

(56) References Cited

U.S. PATENT DOCUMENTS

| | | | | |
|---|---|---|---|---|
| 2003/0206640 | A1* | 11/2003 | Malvar | H03H 21/0012 |
| | | | | 381/93 |
| 2007/0291591 | A1* | 12/2007 | Peng | G01S 15/104 |
| | | | | 367/101 |
| 2013/0258811 | A1 | 10/2013 | Guigne et al. | |
| 2014/0269166 | A1* | 9/2014 | Siedenburg | G01S 15/8915 |
| | | | | 367/11 |

OTHER PUBLICATIONS

PCT International Search Report and Written Opinion dated Aug. 9, 2016 corresponding to International Application No. PCT/US2016/020580; 11 Pages.

"CMOS, 125 MHz Complete DDS Synthesizer AD9850;" Analog Devices, rev. H; Jan. 1, 2013; 20 pages.

Response to Office Action dated Sep. 25, 2017 and filed on Dec. 12, 2017; 12 pages.

Notice of Allowance dated Feb. 28, 2018 for U.S. Appl. No. 14/644,866; 7 pages.

"Beamwidth" Wikipedia dated Dec. 21, 2017; https://en.wikipedia.org/wiki/Beamwidth; 2 pages.

Response to EPO Communication filed on Apr. 30, 2018 for EP Pat. Appl. No. EP16726439.9; 3 pages.

Amended Specification to EPO Communication filed on Apr. 30, 2018 for EP Pat. Appl. No. EP16726439.9; 3 pages.

Amended Claims to EPO Communication filed on Apr. 30, 2018 for EP Pat. Appl. No. EP16726439.9; 4 pages.

\* cited by examiner

WIDEBAND CHANNEL EQUALIZATION FOR SIGNALS PROPAGATED IN LOSSY TRANSMISSION MEDIA

CROSS REFERENCE TO RELATED APPLICATIONS

This application claims the benefit under 35 U.S.C. § 119(e) of U.S. Provisional Application No. 62/131,556 filed Mar. 11, 2015, which application is incorporated herein by reference in its entirety.

FIELD OF THE INVENTION

This invention relates generally to energy transmission systems, for example, sonar systems, operable to generate a wideband signal into a lossy transmission medium, for example, water, and, more particularly, to an energy transmission system, for example, a sonar system, that has a compensation filter with a characteristic that changes with time during a received signal.

BACKGROUND

Various types of systems (e.g., communication systems, sonar imaging systems, etc.) use transmission of energy (e.g. electromagnetic energy, acoustic energy, etc.) though a transmission medium (e.g., air, water, etc.). Some transmission media have a frequency dependent loss characteristic. In some applications (e.g., narrowband applications) this frequency dependent loss characteristic has little effect on system performance. However, in other applications (e.g., wideband applications) this frequency dependent loss characteristic can negatively impact system performance.

Acoustic energy, i.e. sound, and particularly sound propagating in water, is known to have a particularly strong relationship between sound frequency and sound intensity (power per unit area) versus range from a transmitting source. Higher frequency sound loses intensity with range more than low frequency sound.

There is a desire to improve the resolution of systems that transmit energy, for example, particular, acoustic imaging systems. Accordingly, there has been a desire to develop new systems that use larger apertures in order to increase azimuthal resolution and that use higher bandwidth pulses in order to increase range-wise resolution.

The use of wideband transmissions, followed by pulse compression using a matched filter, provides a resolution equal to BW/(2*C), where BW is the bandwidth of the pulse and C is the speed of the wave in the medium.

As sound travels outward through a medium, e.g., water, intensity (power per unit area) of the sound is reduced. The reduction in intensity is due to a variety of propagation loss factors, including, but not limited to, spreading loss and absorption loss. For spreading loss, intensity of the sound is reduced with range as the sound increasingly spreads (e.g., spherically) with increasing range. For absorption loss, intensity of the sound is reduced with range due to heating of the medium associated with molecular action of the medium.

Spreading loss is a function of spreading geometry of the projected sound and is frequency independent. In contrast, absorption loss can be highly dependent on the frequency of the energy, for example, sound travelling through the medium and also depends on properties of the medium itself, e.g., density, temperature, salinity, etc.

Sound travelling in water is used in examples herein. However, the same or similar apparatus and techniques can apply to any energy, with sufficient bandwidth, travelling through a lossy medium to a range, resulting in a frequency-dependent loss at the range within the bandwidth.

Figure 1:
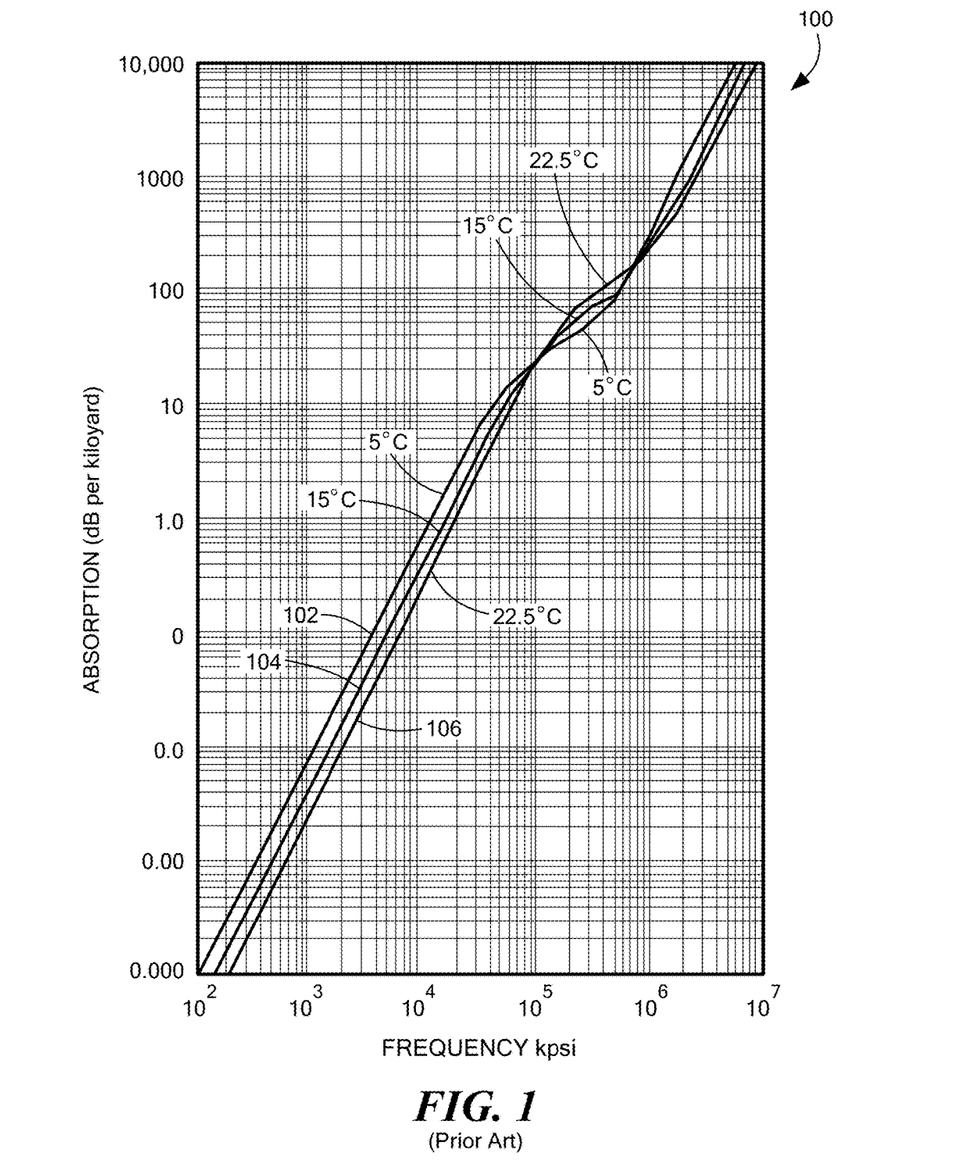
FIG. 1 is a graph showing a prior art relationship between frequency of sound and absorption of sound propagating in water.

Referring now to FIG. 1, a graph 100 has a horizontal axis with a log scale in units of frequency in cycles per second (i.e., Hertz), and a vertical axis with a log scale in units of absorption loss in dB per kiloyard. Absorption loss curves 102, 104, 106 show losses for an acoustic signal as a function of frequency for sound traveling in the ocean (salt water) at three different water temperatures, five degrees Celsius, fifteen degrees Celsius, and 22.5 degrees Celsius, respectively.

As can be seen from the absorption curves 102, 104, 106, at lower frequencies, the absorption coefficient is smaller and changes less rapidly with frequency.

Thus, for narrowband signals, at lower frequencies, and for shorter ranges, it is reasonable to make the assumption that the absorption coefficient (and absorption loss) across the band of the transmission frequencies is approximately the same, and is also small. At the lower frequencies, it will be appreciated that the primary cause of sound propagation loss is spreading loss and not absorption loss.

As can also be seen from the absorption curves 102, 104, 106, at higher frequencies, and for wider bandwidth signals, absorption loss can be more dominant than spreading loss, and the absorption loss can vary across the band of transmission frequencies.

The net effect of a propagation path dominated by absorption loss, where the absorption coefficient varies greatly across a transmitted signal within a frequency band of interest from a lower frequency to a higher frequency, is that, an echo returned from a target at range in response to a transmitted signal is not white (i.e., not flat with frequency, i.e., colored). From FIG. 1 it should be apparent that, amplitude of frequency content of the received (or return echo) signal is higher towards the lower frequency end of a frequency band of interest because of the differences in absorption between low and high frequencies.

The longer the propagation path, the more exacerbated this effect becomes. Thus, lower frequency transmitted signals travelling greater ranges will experience a similar effect as higher frequency transmitted signals travelling shorter ranges.

As described above, it is desirable to use wider bandwidth signals and to use pulse compression in order to improve range-wise resolution. However, if the propagation path adds significant acoustic color (non-whiteness) to the received (or return echo) signal, then pulse compression, for example, pulse compression that uses cross correlation of the received signal with a replica related to the transmitted signal (i.e., replica correlation), even using a replica that is compensated for the frequency-dependent loss in the medium, will not allow recovery of a fully pulse compressed signal, and the range-wise resolution will be degraded.

SUMMARY

The present invention can use relatively wide bandwidth signals and can employ a compensation filter that allows recovery of an improved pulse compressed signal.

A compensation filter and associated method are operable to receive a received signal in response to a transmitted signal, the received signal having a time duration. The compensation filter is operable to generate a compensated signal. The compensation filter changes shape of an associated transfer function during the time duration of the received signal to result in the compensated signal having an improved spectral flatness throughout the time duration of the received signal. The compensation filter can be used in a sonar system.

In accordance with an example useful for understanding an aspect of the present invention, a compensation filter can include:

a digital filter having a plurality of filter taps, the digital filter coupled to receive sequential samples of a received signal and to generate a compensated signal, the received signal received in response to a transmitted signal; and an electronic memory coupled to the plurality of filter taps, wherein the electronic memory is operable to store a plurality of filter coefficient values, wherein the electronic memory is further operable to provide different sequential groups of the plurality of stored filter coefficient values to the plurality of filter taps synchronously with the sequential samples of the received signal, resulting in the digital filter applying different filter transfer characteristics to the sequential samples at different times of the received signal, wherein the different sequential groups of the plurality of filter coefficient values is selected to flatten a frequency spectrum of the compensated signal at the different times of the received signal.

In some embodiments, the above compensation filter can include one or more of the flowing aspects in any combination.

In some embodiments of the above compensation filter, the transmitted signal and the received signal travel though water as a transmitted sonar signal and a received sonar signal.

In some embodiments of the above compensation filter, the transmitted sonar signal comprises an FM (frequency modulated) signal.

In some embodiments of the above compensation filter, the transmitted sonar signal comprises a CTFM (continuous transmission frequency modulated) signal.

In some embodiments of the above compensation filter, the transmitted sonar signal has a lowest frequency of about five kilohertz and a highest frequency of about ten kilohertz.

In some embodiments of the above compensation filter, the transmitted sonar signal has a lowest frequency of about 2.5 megahertz and a highest frequency of about five megahertz.

In accordance with another example useful for understanding another aspect of the present invention, a method of filtering a received signal can include:

receiving sequential samples of the received signal with a digital filter to generate a compensated signal, the digital filter having a plurality of filter taps, the received signal received in response to a transmitted signal;

storing a plurality of filter coefficient values; and providing different sequential groups of the plurality of stored filter coefficient values to the plurality of filter taps synchronously with the sequential samples of the received signal, resulting in the digital filter applying different filter transfer characteristics to the sequential samples at different times of the received signal, wherein the different sequential groups of the plurality of filter coefficient values is selected to flatten a frequency spectrum of the compensated signal at the different times of the received signal.

In some embodiments, the above method can include one or more of the flowing aspects in any combination.

In some embodiments of the above method, the transmitted single and the received signal travel though water as a transmitted sonar signal and a received sonar signal.

In some embodiments of the above method, the transmitted sonar signal comprises an FM (frequency modulated) signal In some embodiments of the above method, the transmitted sonar signal comprises a CTFM (continuous transmission frequency modulated) signal.

In some embodiments of the above method, the transmitted sonar signal has a lowest frequency of about five kilohertz and a highest frequency of about ten kilohertz.

In some embodiments of the above method, the transmitted sonar signal has a lowest frequency of about 2.5 megahertz and a highest frequency of about five megahertz.

In some embodiments, the above storing the plurality of filter coefficient values can include:

generating a first matrix of absorption values as a function of range to a target and frequency;

normalizing the first matrix to generate a second matrix of normalized absorption values as a function of the range and the frequency;

generating desired normalized filter transfer characteristics as a function of the range and the frequency in accordance with the first matrix;

generating a third matrix of filter coefficient values as a function of the range and the frequency in accordance with the desired normalized filter transfer characteristics; and storing the third matrix of filter coefficient values in an electronic memory as the plurality of stored filter coefficient values.

In accordance with another example useful for understanding another aspect of the present invention, a sonar system can include:

a compensation filter, wherein the compensation filter can include:

a digital filter having a plurality of filter taps, the digital filter coupled to receive sequential samples of a received sonar signal and to generate a compensated signal, the received sonar signal received in response to a transmitted sonar signal; and an electronic memory coupled to the plurality of filter taps, wherein the electronic memory is operable to store a plurality of filter coefficient values, wherein the electronic memory is further operable to provide different sequential groups of the plurality of stored filter coefficient values to the plurality of filter taps synchronously with the sequential samples of the received signal, resulting in the digital filter applying different filter transfer characteristics to the sequential samples at different times of the received signal, wherein the different sequential groups of the plurality of filter coefficient values is selected to flatten a frequency spectrum of the compensated signal at the different times of the received signal.

In some embodiments, the above sonar system can include one or more of the flowing aspects in any combination.

In some embodiments of the above sonar system, the transmitted sonar signal comprises an FM (frequency modulated) signal.

In some embodiments of the above sonar system, the transmitted sonar signal comprises a CTFM (continuous transmission frequency modulated) signal.

In some embodiments of the above sonar system, the transmitted sonar signal has a lowest frequency of about five kilohertz and a highest frequency of about ten kilohertz.

In some embodiments of the above sonar system, the transmitted sonar signal has a lowest frequency of about 2.5 megahertz and a highest frequency of about five megahertz.

In some embodiments, the above sonar system can further include:

a matched filter to receive the compensated signal and operable to time compress the compensated signal.

In some embodiments of the above sonar system, the matched filter can include:

a replica correlator coupled to receive the compensated signal, coupled to receive a replica signal related to the transmitted sonar signal, and operable to generate a correlation signal.

BRIEF DESCRIPTION OF THE DRAWINGS

The foregoing features of the invention, as well as the invention itself may be more fully understood from the following detailed description of the drawings, in which.

DETAILED DESCRIPTION

Before describing the present invention, some introductory concepts and terminology are explained.

As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals.

In some embodiments, the "processor" can be embodied in an application specific integrated circuit (ASIC), which can be an analog ASIC or a digital ASIC. In some embodiments, the "processor" can be embodied in a microprocessor with associated program memory. In some embodiments, the "processor" can be embodied in a discrete electronic circuit, which can be an analog or digital.

As used herein, the term "module" is used to describe a "processor."

A processor can contain internal processors or internal modules that perform portions of the function, operation, or sequence of operations of the processor. Similarly, a module can contain internal processors or internal modules that perform portions of the function, operation, or sequence of operations of the module.

While electronic circuits shown in figures herein may be shown in the form of analog blocks or digital blocks, it will be understood that the analog blocks can be replaced by digital blocks that perform the same or similar functions and the digital blocks can be replaced by analog blocks that perform the same or similar functions. Analog-to-digital or digital-to-analog conversions may not be explicitly shown in the figures, but should be understood.

As used herein, the terms "line" and "linear" are used to describe either a straight line or a curved line. The line can be described by a function having any order less than infinite.

To allow matched filter pulse compression to approach full bandwidth advantages of the original transmitted signal, it is desirable to pre-whiten a frequency spectrum of the return (echo) signal before the matched filter by compensating for the channel loss characteristics of the medium. To this end and described below, a compensation filter can be used.

The design of the compensation filter described below is not stationary, in that it is desirable for the compensation filter to compensate for the increasing difference (low frequency to high frequency) of absorption as a function of range to a target. In other words, the compensation filter can have different characteristics at different ranges, i.e., the compensation filter can change transfer function with time.

Figure 2:
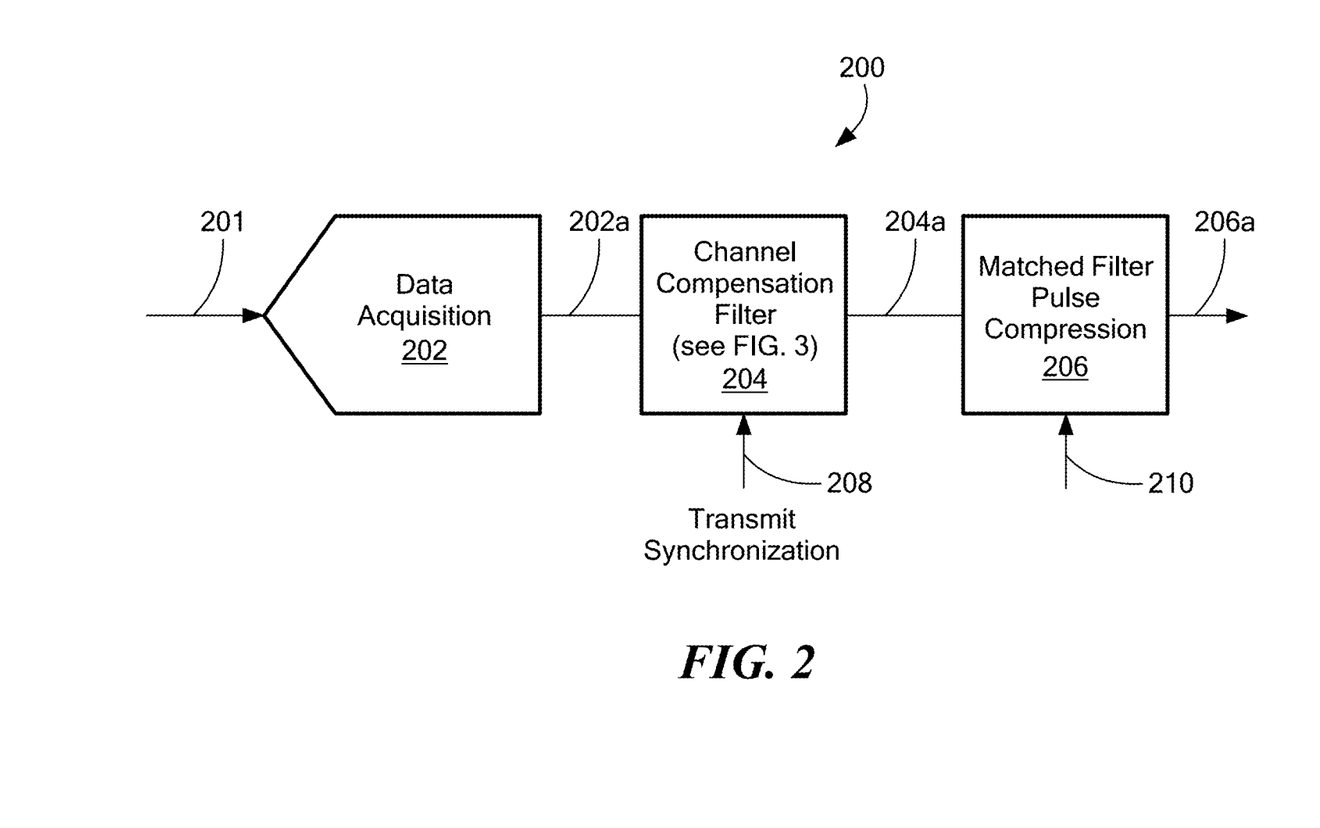
FIG. 2 is a block diagram showing a partial system having a data acquisition module, a channel compensation filter, and a matched filter.

Referring now to FIG. 2, a partial system 200 can include a data acquisition module 202 coupled to receive a signal 201, for example, a signal generated by one or more hydrophones (not shown). In some embodiments, the signal 201 can be an analog signal and in other embodiments, the signal 210 can be a digital signal having digital data.

The data acquisition module 202 can be operable to generate data 202a, for example, digital data, associated with the one or more hydrophones (not shown). In some embodiments, beamforming (see, e.g., FIG. 6) can be performed within the data acquisition module 202, in which case, the data 202a can be associated with one beamformed signal.

A channel compensation filter 204 can be coupled to the data acquisition module 202 and can be operable to generate a compensated signal 204a (e.g., compensated data), which can be a filtered version of the data 202a. An illustrative compensation filter is described more fully below in conjunction with FIG. 3.

A matched filter module 206 can be coupled to the channel compensation filter 204 and operable to generate a compressed signal 206a (e.g., time-compressed). In some embodiments, the matched filter module 206 can be a cross correlator, or, more particularly, a replica correlator, operable to correlate the compensated signal 204a with a replica signal 210 representative of an originally transmitted signal.

In some embodiments, the channel compensation filter 204 comprises a digital filter having a table or matrix (not shown, see, e.g., FIG. 3) of compensation values (also referred to herein as tap weight values). The channel compensation filter 204 can be coupled to receive a transmit synchronization signal 208 that can synchronize selected ones of the tap weight values that are used at respective times, synchronized with the transmitted signal. Thus, the compensation filter 204 can be non-stationary, i.e., selected tap weight values stored in and used by the compensation filter 204 can change with time, and therefore, the compensation filter 204 can change transfer function with time during a received signal.

The realization of the non-stationary compensation filter 204 can be achieved using a number of different circuits and methods, including both analog and digital circuits and methods. However, because of the non-straight nature of the log-log absorption curve (see, e.g. FIG. 1), and for other reasons described more fully below, and where it is desirable to use the filter to compensate for either frequency modulated (FM) signals or continuous transmission frequency modulated (CTFM) signals, a finite impulse response (FIR) filter provides advantages.

Figure 3:
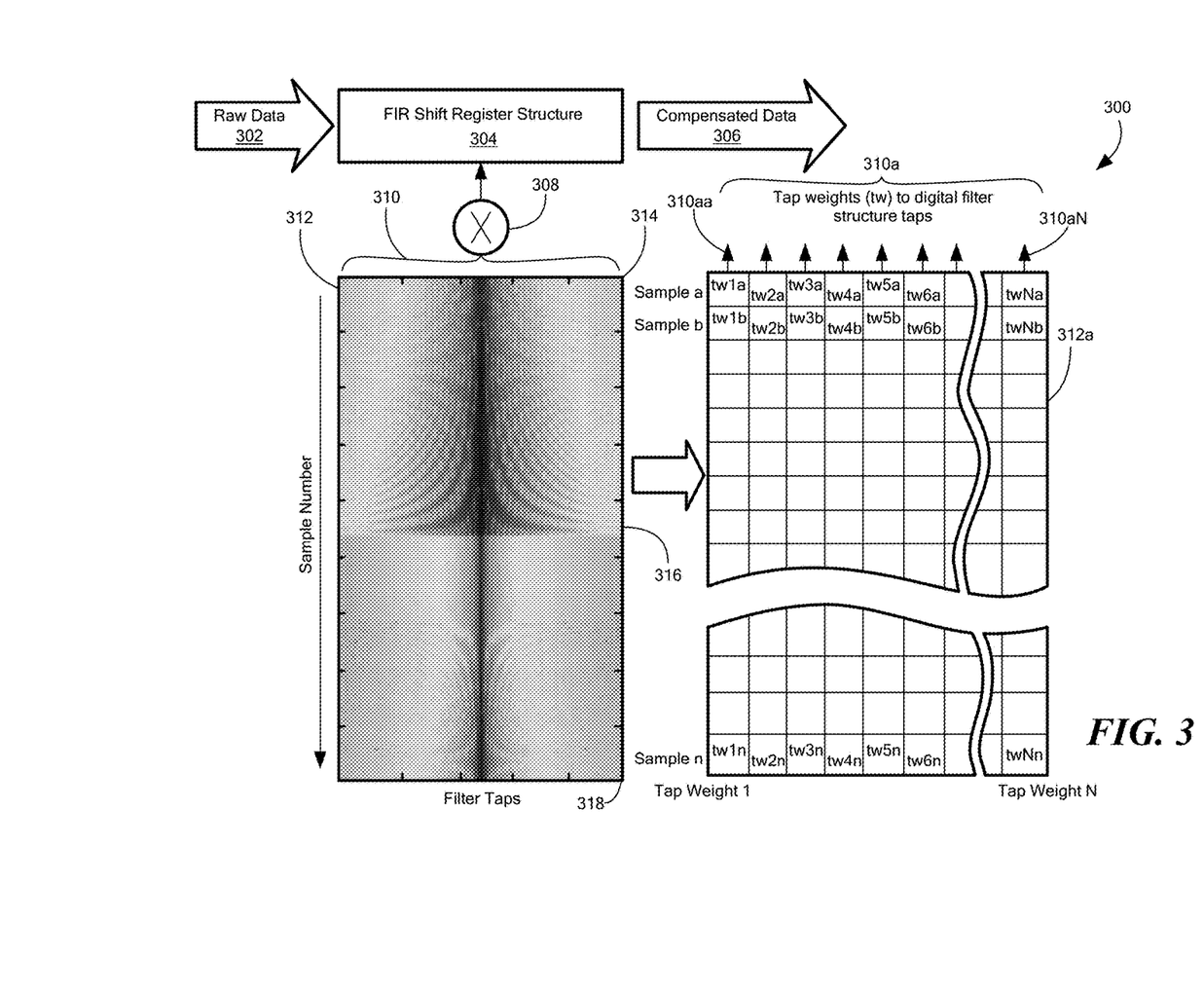
FIG. 3 is a block diagram showing an illustrative compensation filter as may be used in the channel compensation filter of FIG. 2, the compensation filter having a matrix of tap weight values.

Referring now to FIG. 3, a compensation filter 300 can be the same as or similar to the compensation filter 204 of FIG. 2.

From discussion below, it should be understood that the compensation filter 300 can be representative of an FIR (finite impulse response) digital filter.

An FIR (finite impulse response) shift register structure 304 can receive data 302, which can be the same as or similar to the data 202a of FIG. 2. The FIR shift register structure 304 is operable to generate compensated data 306, which can be the same as or similar to the compensated data 204a of FIG. 2.

A multiplication symbol 308 is indicative of a plurality of filter taps 308 (i.e. multiplications) associated with the FIR shift register structure 304.

The plurality of filter taps 308 can be coupled to receive filter coefficient values 310 from a matrix 312 of filter coefficient values 310, also referred to herein as tap weight values. The matrix 312 is equivalent to a matrix 312a, and the tap weight values 310 are equivalent to tap weight values 310a, of which a tap weight value 310aa is but one example of the tap weight values 310, 310a.

The matrix 312 (i.e., the matrix 312a) can be arranged such that rows are indicative of sample values of the data 302, which can be equivalent to or related to time, which can be equivalent to or related to range to a target. The matrix 312 (i.e., the matrix 312a) can be arranged such that columns are indicative of different tap weight values. Thus, the matrices 312, 312a can provide different tap weight values from the different rows of the matrix 312, 312a to the FIR shift register structure 304 via the plurality of inputs taps 308 at different times, resulting in the channel compensation filter 300 having different transfer functions at different times within a received signal.

In other words, the plurality of filter coefficient values 310 (tap weights values) can be applied to the compensation filter 300, wherein applied filter coefficients (i.e., a row of the matrix 312 or 312a) can change to a new plurality of filter coefficient values (tap weight values), (i.e., to a new row of the matrix 312 or 312a), upon each received sample, or otherwise from time to time, for example, when one or more of the tap weight values are different.

Example sample numbers 314, 316, and 318 and associated filter coefficient values are used for further discussion below. The filter coefficient values 312, and, in particular, a discontinuity of the filter coefficient values after sample number 316, are indicative of one particular example, in which a pulse length of FM sound travelling in the water extends from a transmitter to a maximum range, and for which the transmitter is silent for a return trip of the sound from the range. Thus, in this example, a duty cycle of the FM transmission is fifty percent, and the sample number 316 is half way through the samples.

With this example, in the filter coefficient values 312, attention is given to a discontinuity in the filter coefficient values 312 (and associated filter transfer function) apparent by different shading after sample number 316 for the following reasons.

Using an example for which the transmitted sound sweeps in an FM signal from a low frequency to a high frequency, it should be apparent that, from sample number 314 (i.e., from a first received sample in a ping cycle) to sample number 316, sound can be arriving at a receiver both from the FM sweep being presently transmitted (short range return at low frequency), and also, at the same time, from a prior FM sweep transmitted in a prior ping cycle and returning from longer ranges. Thus, from sample number 314 to sample number 316, more than one frequency can be received at the same time, and from different ranges. The transfer function of the resulting compensation filter 300 can have a transfer characteristic to account for the receptions of different frequencies, and can have a step at a frequency that changes with sample number (i.e., with time).

In contrast, after sample number 316 to sample number 318, the transmitted sound has stopped and the received sound is returning from the range and impinges upon the receiver in the FM sweep. Thus, after the sample number 316 to the sample number 318, only one respective frequency is received at the receiver in any sample, i.e., range.

In view of the above, the filter coefficient values from the sample 314 to the sample 316 can be different than the filter coefficient values after sample 316 to the sample 318, and therefore, a discontinuity in the filter coefficient values 312 can occur after the sample number 316.

For other examples where a duty cycle of the transmitted FM sweep is other than fifty percent, it should be apparent that the discontinuity in the filter coefficient values 312 can occur at a different sample number other than at the fifty percent sample number, or there may be no discontinuity, for example, for one hundred percent duty cycle CTFM.

It should be noted that the compensation filter 300 may be no more computationally intensive than a standard FIR digital filter, requiring Number of Samples×Number of FIR Taps multiplies per data sample of the data 302.

The compensation filter 300 is indicative of an FIR digital filter having N filter taps 308. The number of filter taps 308, N, can be determined according to an anticipated deviation in the absorption loss (e.g., ten dB difference) across the band of interest and can be determined using standard FIR design tools by techniques described below in conjunction with FIG. 4. In some embodiments, the number of the plurality of filter taps 308 and the length of FIR shift register structure 304 will be several hundred taps and several hundred shift registers in length. In some particular embodiments, the compensation filter 300 (i.e., the plurality of filter taps 308) can include 64, 128, 256, 512, 1024, or 2048 filter taps. However, any number of filter taps is possible, including fewer than 64 more than 2048, or a number of filter taps that is not a power of two.

The matrix 312 or 312a can have n rows, which can correspond to n samples of the signal 302. In some embodiments, the number n can span a ping cycle of a sonar system (see, e.g., FIG. 6), and for a next ping cycle and for all subsequent ping cycles, the tap weight values, i.e., the rows of the matrix 312 or 312a applied to plurality of filter taps 308, can repeat.

Each filter coefficient value (tap weight value), e.g., 310aa, can have any number of digital bits, for example, four bits, eight bits, or sixteen bits.

In a traditional ping and listen system, be it sonar or radar, the transmit pulse is comparatively short when compared to the receive acquisition time. With a short transmission, range can fairly closely be equated to a time since the transmit pulse was transmitted. Thus, all frequencies in a given sample of a received signal are from approximately the same range.

However, in a continuous transmission frequency modulated (CTFM) sonar system, a longer transmission is used, which has a time duration throughout most of (or all of) a repetition cycle time of the CTFM sonar system (but usually with some time guard band). For the CTFM system, all frequencies in a given sample of a received signal are not from the same range. Furthermore, each received sample can contain a plurality of frequencies.

For a CTFM system, it is therefore desirable to modify the matrix of filter coefficients of 312, 312a to account for a temporal offset of different spectral components (i.e., different frequencies) of the received signal (or echo return signal) at a time of each sample of the return signal. Once this has been completed, the sample process, calculating a compensation matrix and running the desired characteristics through a filter coefficient generation tool to provide a matrix of filter coefficients, synchronization with a zero mark time of the transmitted CTFM pulse can be used.

Figure 4:
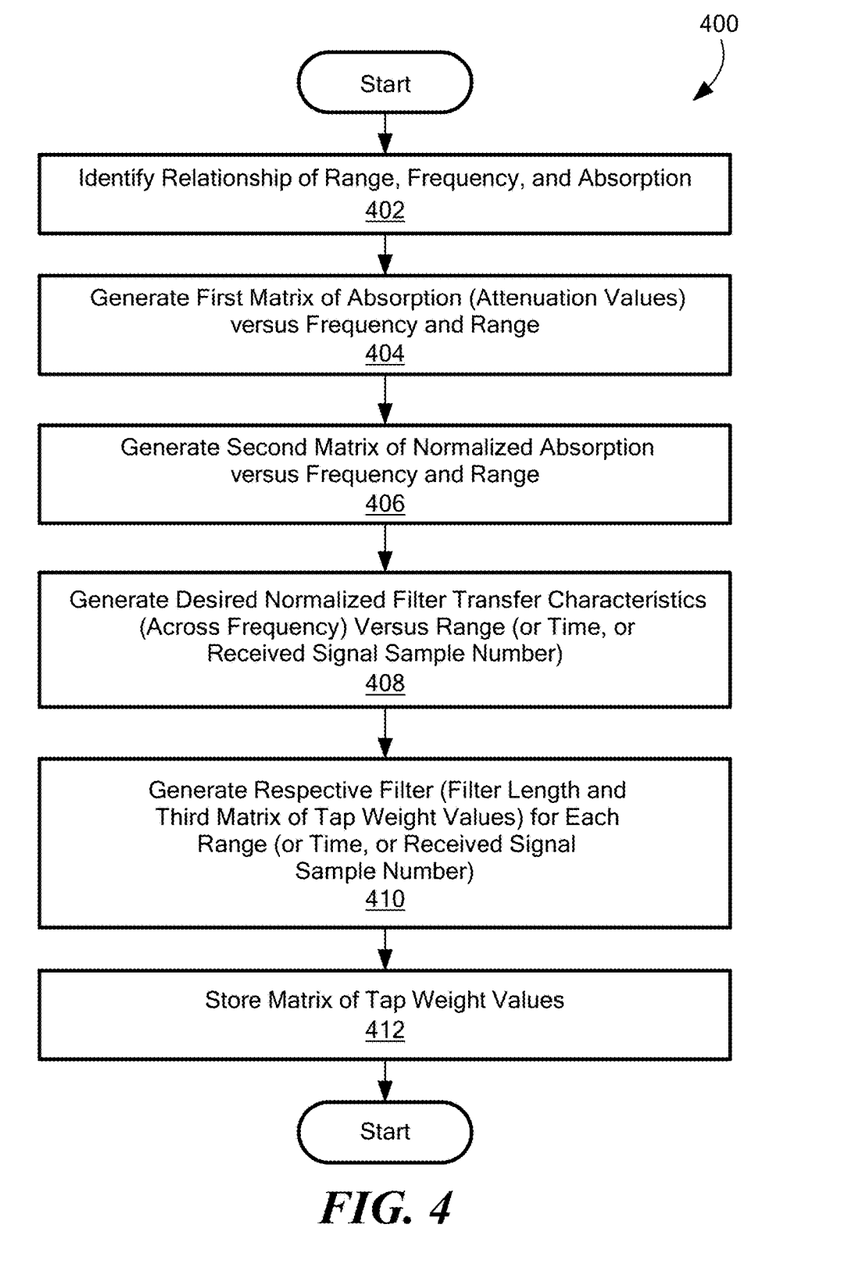
FIG. 4 is a flow chart showing an illustrative process that can be used to generate the matrix of tap weight values of FIG. 3.

FIG. 4 below describes a process of generating the matrix of filter coefficients and resulting filter that changes characteristics with time during a received signal.

The advantage of this approach to channel compensation is most evident when the frequencies are very high and the bandwidths are very wide. However, the above-described compensation filter also provides useful improvement at lower frequencies where the bandwidth is narrower but the ranges are longer.

In one particular example, an illustrative medium frequency anti-submarine warfare (ASW) sonar has an operational frequency between about five kHz and about ten kHz and has a useful operational range to a target from about one kiloyard to about thirty kiloyards.

At anti-submarine warfare (ASW) frequencies, FM systems, for example, CTFM systems, that sweep from about five kHz to about ten kHz (five kHz bandwidth) can be used to provide improved resolution for detection and classification. Also, the additional bandwidth and subsequent pulse compression results in gain against unwanted surface and bottom reverberation.

The theoretical gain against reverberation is $10*\log_{10}$(bandwidth*time). This gain is achieved because, for a fixed target strength scatterer (one where the cross sectional area is small with respect to the resolution), return strength remains constant as the resolution of the pulse increases. In contrast, return signal strength from a diffuse scatterer (e.g., the seabed or the sea surface) decreases with the cross sectional area of the incident wavefront. As the resolution increases, the cross-sectional area (post match filter) effectively decreases.

For the ASW CTFM example, there is a significant difference in the absorption spectrum at the high end of the frequency band when compared with the low end of the frequency band. (see, e.g., FIG. 5)

FM sound sweeping from about five kHz to about ten kHz has absorption coefficients from about 0.1 dB per kiloyard to about one dB per kiloyard. At a two-way range of sixty kiloyards (i.e., target range of thirty kiloyards), the absorption changes from about six dB to about sixty dB across the swept operating band. This sound propagating through water from a transmitter to a target thirty kiloyards away experiences a large difference in received sound energy across the swept operating band. Essentially, even though the frequencies are low, the range is long, and thus, still absorption has a substantially different effect through the frequency band.

Applying an all-range pre-whitening filter (i.e., a non-changing filter) to the ASW CTFM received signal will not result in the desired improvement, because while this will make the spectrum flat at a specific range, it will still result in distortion (non-flatness) at other ranges. Essentially, higher frequencies in a CTFM received signal become more attenuated at longer ranges, i.e., more attenuated with time in the received signal. However, it is desirable that the sonar operate equally well at all ranges.

Applying the above-described compensation filter, which has filter weights that change with received signal samples (i.e. change with time and range), resulting in a filter transfer function that changes with time, can provide the desired improved flatness of a signal spectrum for all operational ranges. The signal with the improved flatness at all ranges can then be applied to a matched filter.

In another particular, higher frequency, underwater imaging example, FM sound sweeping from about 2.5 MHz to about 5 MHz has absorption coefficients in the ocean from about one thousand to about five thousand dB per kiloyard. Even at a two way range of ten yards (i.e., imaged object five yards away), the absorption changes from about ten dB to about fifty dB across the swept operating band. This sound propagating through water to an object only five yards away experiences a large difference in received sound energy across the swept operating band.

Thus, it should be recognized that it is a combination of range, bandwidth of the transmitted sound, frequency of the transmitted sound, and absorption characteristics of the medium, which all contribute in combination to the amount of difference in attenuation between the higher transmitted frequencies and the lower transmitted frequencies.

While the above examples describe sound propagating in the ocean, it should be recognized that the same techniques apply to any form of energy, e.g., electromagnetic energy, having a combination of range, bandwidth, frequency, and propagation medium for which different spectral components of the transmitted signal have impactfully different amounts of loss for the particular combination.

While FM and CTFM systems are described above, the same compensation filter can be used to flatten a frequency spectrum of other types of received signals, for example, spread spectrum signals (including, but not limited to, pseudo random noise modulated signals and frequency hopping signals), and amplitude modulated (AM) signals.

While a digital filter structure in the form of a FIR filter is described above in conjunction with FIG. 3, in other embodiments, a digital filter structure in the form of an infinite impulse response (IIR) filter can be used.

The digital filter structure can receive different respective tap weight values at each one of the times of the samples of the received signal. However, it should be understood that that the digital filter structure can also receive the same tap weights at some, but not all, of the different times of the samples of the received signal.

Any of the above described digital filter structures can be implemented at gate level with shift time delays, with multiplications, and with summations. However the same digital filter structures can also be implemented in software code and software instructions operating upon data. Similar structure can also be implemented in analog form using analog samples, for example, with a charge coupled device (CCD) structure or bucket brigade device (BBD) structure.

While the matched filter is described to be a replica correlator in some examples above, see, e.g., FIG. 2, and below, see, e.g., FIG. 6, the matched filter can be another form of filter.

Figure 6:
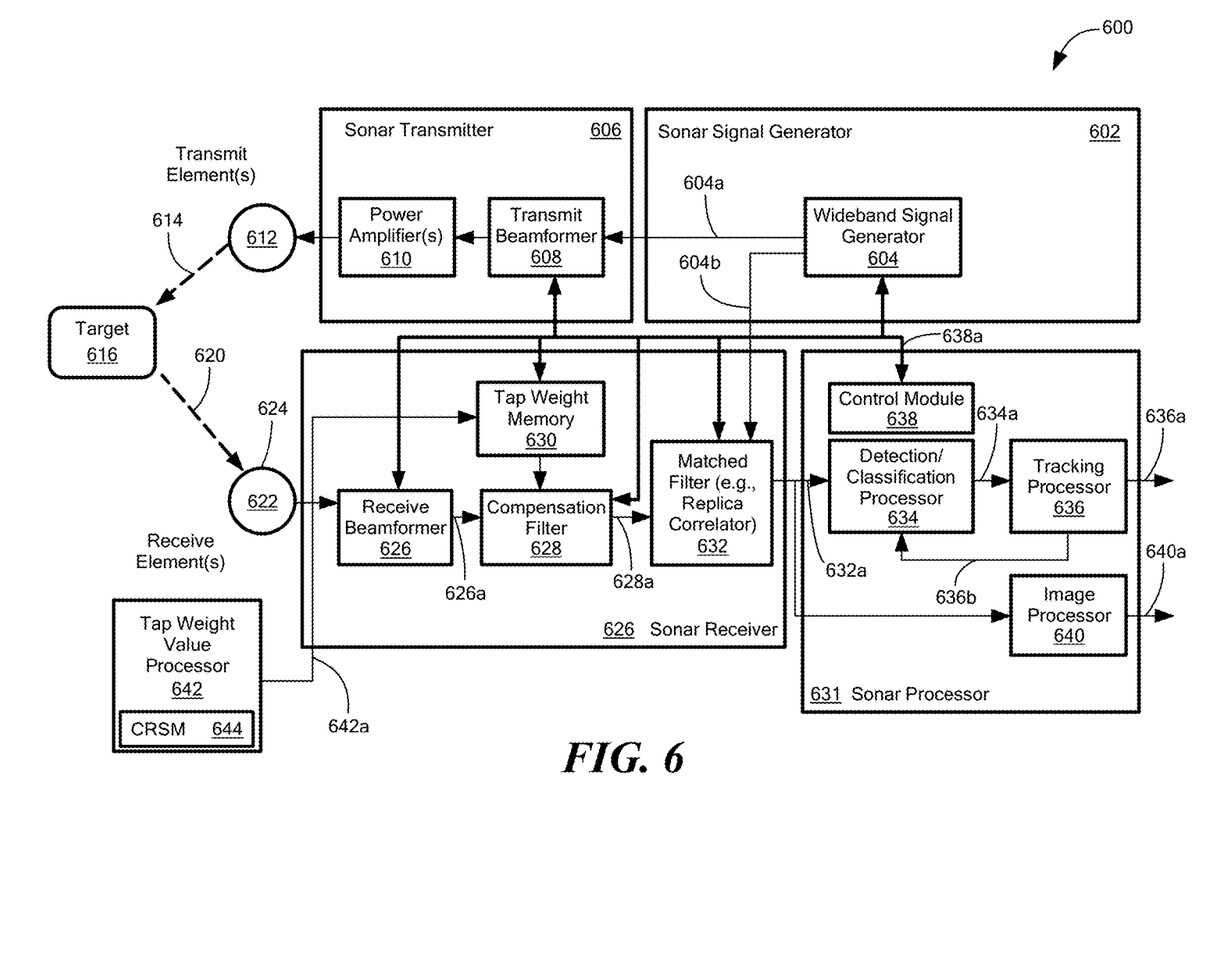
FIG. 6 is block diagram of an illustrative sonar system that has a compensation filter and a matched filter that can use the compensation filter of FIGS. 2 and 3.

It should be appreciated that FIG. 4 show a flowchart corresponding to the below contemplated technique which would be implemented to generate filter compensation values (i.e. tap weight values) used in conjunction with a computer system, e.g., 640 (FIG. 6).

Rectangular elements (typified by element 402 in FIG. 4), herein denoted "processing blocks," represent computer software instructions or groups of instructions. Diamond shaped elements, of which none are shown, herein denoted "decision blocks," represent computer software instructions, or groups of instructions, which affect the execution of the computer software instructions represented by the processing blocks.

The processing and decision blocks represent steps can be performed by a general purpose computer, e.g., 640 of FIG. 6, or alternatively, by a functionally equivalent circuit, such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

Referring now to FIG. 4, in order to generate the compensation filter 300 of FIG. 3 and the associated matrix 312, 312a of tap weight values described above, a process 400 can be used.

At block 402, a relationship between range to a target, frequency, and signal absorption can be identified. The relationship can be known, measured, or derived.

Figure 5:
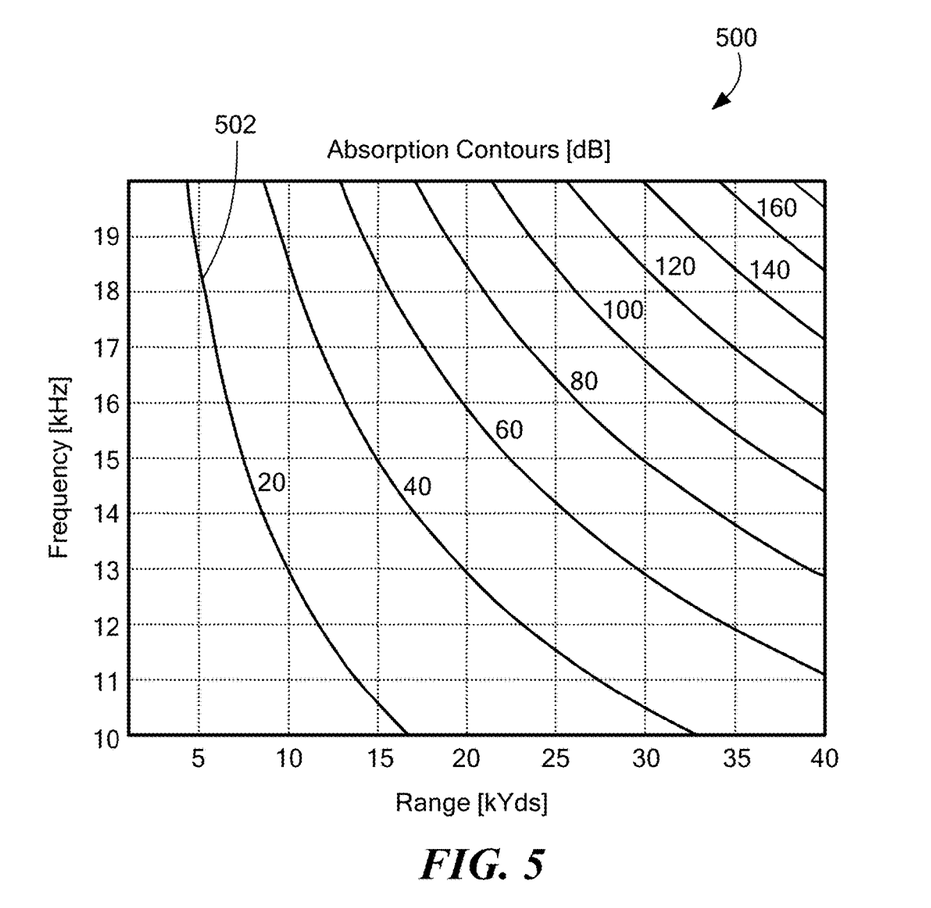
FIG. 5 is a graph of absorption contours that can be used to generate a matrix that can be used to generate the matrix of tap weight values of FIG. 4.

Turning briefly to FIG. 5, to illustrate the above-described ASW CTFM example, and to illustrate the block 402, a graph 500 shows prior art illustrative values for propagation of sound in the ocean. The graph 500 has a horizontal axis with a scale in units of range in kiloyards and a vertical axis with a scale in units of frequency in kilohertz. Absorption contours, for example, an absorption contour 502, are indicative of respective absorption of sound in the water as shown. In the graph 500, absorption values, i.e., attenuation values, increase from left to right.

Alternatively, the graph 500 can be replaced by measured values or calculated values.

Returning again to FIG. 4, using the graph 500, or from a similar graph showing the frequencies and ranges of interest, at block 404, a first matrix can be generated or calculated containing the absorption contribution (i.e., absorption values) as a function of both frequency and of range. In one illustrative example, the absorption values can be indicative of a shape, sloping with frequency, wherein the slope changes with range (i.e., time). The slope may or may not be a straight line. Furthermore, the slope may have a step and the slope may change sign. (see, e.g., discussion of FIG. 3 above)

Based on this calculation or measurement and the resulting first matrix, a desired filter shape can be calculated that can correct for the acoustic color (non-whiteness) of the received signal (or echo return).

To achieve the above, at block 406, values of the absorption values in the above first matrix can be normalized to generate a second matrix of normalized attenuation values (absorption values) versus frequency and range. In one illustrative example, the normalized absorption values can be indicative of a normalized shape, sloping with frequency, wherein the slope changes with range (i.e., time). The slope may or may not be a straight line. Furthermore, the slope may have a step and the slope may change sign.

At block 408, from the normalized attenuation values of block 406, desired normalized filter transfer characteristic values can be determined, which can be represented in a desired filter shape matrix. For example, a normalized attenuation value in block 406 that indicates ten dB attenuation corresponds to a desired normalized filter transfer characteristic value of positive ten dB. The desired filter shape matrix can contain desired normalized filter transfer characteristic values as a function of time (or received signal sample number). It will be understood that the desired normalized filter transfer characteristic values describe desired shapes or amplitude responses of a transfer function of the compensation filter at the various times.

Like the normalized attenuation values, in one illustrative example, the desired normalized filter transfer characteristic can be indicative of a normalized shape, sloping with frequency, that changes with range (i.e., time), but sloping in a direction opposite to the normalized attenuation values. The slope may or may not be a straight line. Furthermore, the slope may have a step and the slope may change sign. A step in the normalized filter transfer characteristic can change frequency position with time.

At block 410, using FIR design tools, a set of compensation filter coefficient values (i.e., tap weight values) can be generated for each range cell (or time, or range) of a return signal to achieve the above-described desired filter shapes This results in a matrix of filter coefficient values (tap weight values) (see, e.g., FIG. 3), each row of the matrix indicative of a different compensation filter transfer function At block 412, the matrix of tap weight values can be stored in conjunction with the compensation filter 300 of FIG. 3, for example as the matrix 312 or 312a.

Since range and time are equivalent, the range cells correspond to time cells, which correspond to sample number, and thus, the filter coefficients applied in the FIR digital filter 300 (and the resulting shape of the filter) essentially change with time during the received signal, i.e., the data 302.

Once calculated (and this can be done once for a given medium/frequency combination), the compensation filter 300 can be applied to the incoming data 302.

Referring now to FIG. 6, a sonar system 600 includes a wideband signal generator 604 configured to generate a wideband transmit signal 604a, for example, a CTFM signal. The wideband transmit signal 604a is received by a transmit beamformer 608 that can generate one or more beamformed transmit signals received by one or more respective power amplifiers 610. The one or more power amplifiers can send signals to one or more respective transmit elements 612 to generate a transmitted sound signal 614 into the water. If there is only one transmit element 612, then the transmit beamformer 608 is not required and only one power amplifier 610 is required.

The transmitted sound signal 614 can imping upon an underwater target 616, e.g., a submarine, and an echo 620 from the target 616 can result.

The echo 620 can be received by one or more receive elements 624, which provide a respective one or more electronic signals to a receive beamformer 626. The receive beamformer 626 can be configured to generate a beamformed signal 626a. If there is only one receive element 624, then the receive beamformer 626 is not required.

It should be appreciated that the beamformed signal 626a can be comprised of a sequential series of signal samples on one signal channel. The signal samples carried on the signal channel can be communicated as serial bits on one physical connection or as a parallel bits on a plurality of parallel connection. In some alternate arrangements, the signal samples can be analog signal samples.

A compensation filter 628 can be coupled to receive the beamformed signal 626a. The compensation filter 628 can be the same as or similar to the compensation filter 204 of FIG. 2 or the compensation filter 300 of FIG. 3. The compensation filter is operable to generate compensated data 628a, which can be the same as or similar to the compensated data 204a of FIG. 2 or the compensated data 306 of FIG. 3.

The compensation filter 628 can be coupled to, or can otherwise include, a tap weight memory 630. The tap weight memory 630 can be configured to store the matrix of tap weight values (e.g., 312 or 312a) described above in conjunction with FIG. 3.

The compensation filter can be coupled before a matched filter 632. In some embodiments, the matched filter 632 can be a replica correlator coupled to receive the compensated data 628a and coupled to receive a replica signal 604b (replica of the wideband transmit signal 604a). The matched filter 632 can be configured to correlate the compensated signal 628a with the replica signal 604b to generate a correlation signal 632a.

In some alternate embodiments, the replica signal 604b is merely representative of the wideband transmit signal 604b.

The correlation signal 632a can be received by a sonar processor 631 having a detection and classification processor 634, which can analyze the correlation signal 632a to detect the target 616 and, in some embodiments, to classify (e.g., submarine, surface ship, etc.) the detected target 616. In some embodiments, a track processor 636 can be coupled to the detector and classification processor 634 and can generate a moving positional track of the target 616 to generate a track signal 636a. In some embodiments, there is more than one target and more than one target can be detected and/or classified, and /or tracked at the same time.

A control module 628 can be configured to control timing of all aspects of the sonar system 600 via control signals 638a. For embodiments in which the sonar system 600 uses computer instructions, the control module 628 can also serve as a storage device for computer instructions.

In some alternate embodiments, the receive beamformer 626 is instead coupled after the matched filter 632, in which case, there can be a plurality of channels in the compensation filter 626.

In other applications, for example, underwater imaging applications, the detection and classification processor 634 and the tracking processor 636 can be replaced by one or more processors that function together as an imaging processor 640 that generates an image signal 640a for recording or for generation of an image on a graphical user interface (not shown).

Not part of the sonar system 600 per se, a tap weight value processor 642 and a computer-readable storage medium 642 associated therewith, can be used to perform a process like the process 400 of FIG. 4 to generate tap weight values 642a, which can be communicated to the sonar system 600 and stored in the tap weight memory 630. The tap weight memory 630 can be a nonvolatile device, like an EEPROM (electrically erasable programmable read only memory), or a PROM (programmable read only memory).

In alternate embodiments, the tap weight memory 630 can be pre-loaded with the tap weight values, loaded before full manufacture of the sonar system 600. For these embodiments, the tap weight memory 630 can be a nonvolatile device, like a fusible memory.

All references cited herein are hereby incorporated herein by reference in their entirety.

Having described preferred embodiments of the invention it will now become apparent to those of ordinary skill in the art that other embodiments incorporating these concepts may be used. Additionally, the software included as part of the invention may be embodied in a computer program product that includes a computer-readable storage medium. For example, such a computer-readable storage medium can include a computer-readable memory device, such as a hard drive device, a RAM, a ROM, a CD-ROM, a DVD-ROM, or a computer diskette, having computer-readable program code segments stored thereon. The term computer-readable storage medium does not include a transitory signal. As used herein, the term "non-transitory" does not exclude computer readable storage media in which data may be temporarily stored. In contrast, a computer-readable transmission medium can include a communications link, either optical, wired, or wireless, having program code segments carried thereon as digital or analog signals. Accordingly, it is submitted that that the invention should not be limited to the described embodiments but rather should be limited only by the spirit and scope of the appended claims. All publications and references cited herein are expressly incorporated herein by reference in their entirety.

Elements of embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A compensation filter, comprising:
a digital filter having a plurality of filter taps, the digital filter coupled to receive sequential samples of a received signal and to generate a compensated signal, the received signal generated in response to a transmitted signal, wherein the received signal and the transmitted signal have known frequencies that change with time, wherein the transmitted signal and the received signal travel though a transmission channel having a known relationship between channel loss per distance and the known frequencies of the received and transmitted signals; and
an electronic memory coupled to the plurality of filter taps, wherein the electronic memory is operable to store a plurality of filter coefficient values, wherein the plurality of filter coefficient values are determined in accordance with the known relationship and in accordance with the known frequencies of the received signal, wherein the electronic memory is further operable to provide different sequential groups of the plurality of stored filter coefficient values to the plurality of filter taps synchronously with the sequential samples of the received signal, resulting in the digital filter applying different filter transfer characteristics to the sequential samples at different times of the received signal, wherein the different sequential groups of the plurality of filter coefficient values is selected to compensate for the channel loss by flattening a frequency spectrum of the compensated signal at the different times of the received signal.

2. The compensation filter of claim 1, wherein the transmission channel comprises water, and wherein the transmitted signal and the received signal travel though the water as a transmitted sonar signal and a received sonar signal.

3. The compensation filter of claim 2, wherein the transmitted sonar signal comprises an FM (frequency modulated) signal.

4. The compensation filter of claim 2, wherein the transmitted sonar signal comprises a CTFM (continuous transmission frequency modulated) signal.

5. The compensation filter of claim 3, wherein the transmitted sonar signal has a lowest frequency of about five kilohertz and a highest frequency of about ten kilohertz.

6. The compensation filter of claim 3, wherein the transmitted sonar signal has a lowest frequency of about 2.5 megahertz and a highest frequency of about five megahertz.

7. A method of filtering a received signal, comprising:
receiving sequential samples of the received signal with a digital filter to generate a compensated signal, the digital filter having a plurality of filter taps, the received signal received in response to a transmitted signal, wherein the received signal and the transmitted signal have known frequencies that change with time, wherein the transmitted signal and the received signal travel though a transmission channel having a known relationship between channel loss per distance and the known frequencies of the received and transmitted signals;
storing a plurality of filter coefficient values wherein the plurality of filter coefficient values are determined in accordance with the known relationship and in accordance with the known frequencies of the received signal; and
providing different sequential groups of the plurality of stored filter coefficient values to the plurality of filter taps synchronously with sequential samples of the received signal, resulting in the digital filter applying different filter transfer characteristics to the sequential samples at different times of the received signal, wherein the different sequential groups of the plurality of filter coefficient values is selected to compensate for the channel loss by flattening a frequency spectrum of the compensated signal at the different times of the received signal.

8. The method of claim 7, wherein the transmission channel comprises water, and wherein the transmitted single and the received signal travel though the water as a transmitted sonar signal and a received sonar signal.

9. The method of claim 8, wherein the transmitted sonar signal comprises an FM (frequency modulated) signal.

10. The method of claim 8, wherein the transmitted sonar signal comprises a CTFM (continuous transmission frequency modulated) signal.

11. The method of claim 9, wherein the transmitted sonar signal has a lowest frequency of about five kilohertz and a highest frequency of about ten kilohertz.

12. The method of claim 9, wherein the transmitted sonar signal has a lowest frequency of about 2.5 megahertz and a highest frequency of about five megahertz.

13. The method of claim 9. wherein the storing the plurality of filter coefficient values comprises:
generating a first matrix of absorption values as a function of range to a target and frequency;
normalizing the first matrix to generate a second matrix of normalized absorption values as a function of the range and the frequency;
generating desired normalized filter transfer characteristics as a function of the range and the frequency in accordance with the first matrix;
generating a third matrix of filter coefficient values as a function of the range and the frequency in accordance with the desired normalized filter transfer characteristics; and
storing the third matrix of filter coefficient values in an electronic memory as the plurality of stored filter coefficient values.

14. A sonar system, comprising:
a compensation filter, the compensation filter comprising:
a digital filter having a plurality of filter taps, the digital filter coupled to receive sequential samples of a received sonar signal and to generate a compensated signal, the received sonar signal generated in response to a transmitted sonar signal, wherein the received signal and the transmitted signal have known frequencies that change with time, wherein the transmitted signal and the received signal travel though a transmission channel having a known relationship between channel loss per distance and the known frequencies of the received and transmitted signals; and
an electronic memory coupled to the plurality of filter taps, wherein the electronic memory is operable to store a plurality of filter coefficient values, wherein the plurality of filter coefficient values are determined in accordance with the known relationship and in accordance with the known frequencies of the received signal, wherein the electronic memory is further operable to provide different sequential groups of the plurality of stored filter coefficient values to the plurality of filter taps synchronously with the sequential samples of the received signal, resulting in the digital filter applying different filter transfer characteristics to the sequential samples at different times of the received signal, wherein the different sequential groups of the plurality of filter coefficient values is selected to compensate for the channel loss by flattening a frequency spectrum of the compensated signal at the different times of the received signal.

15. The sonar system of claim 14, wherein the transmitted sonar signal comprises an FM (frequency modulated) signal.

16. The sonar system of claim 14, wherein the transmitted sonar signal comprises a CTFM (continuous transmission frequency modulated) signal.

17. The sonar system of claim 15, wherein the transmitted sonar signal has a lowest frequency of about five kilohertz and a highest frequency of about ten kilohertz.

18. The sonar system of claim 15, wherein the transmitted sonar signal has a lowest frequency of about 2.5 megahertz and a highest frequency of about five megahertz.

19. The sonar system of claim 15, further comprising:
a matched filter to receive the compensated signal an operable to time compress the compensated signal.

20. The sonar system of claim 19, wherein the matched filter comprises:
a replica correlator coupled to receive the compensated signal, coupled to receive a replica signal related to the transmitted sonar signal, and operable to generate a correlation signal.

21. The compensation filter of claim 1, wherein the digital filter comprises a finite impulse response filter or an infinite impulse response filter.

22. The method of claim 7, wherein the digital filter comprises a finite impulse response filter or an infinite impulse response filter.

23. The sonar system of claim 14, wherein the digital filter comprises a finite impulse filter response or an infinite impulse response filter.

\* \* \* \* \*